United States Patent
Alkan et al.

(10) Patent No.: US 11,301,946 B2
(45) Date of Patent: *Apr. 12, 2022

(54) INTELLIGENT CAREER MONITORING AND CORRECTION IN A COMPUTING ENVIRONMENT

(71) Applicant: INTERNATIONAL BUSINESS MACHINES CORPORATION, Armonk, NY (US)

(72) Inventors: Oznur Alkan, Dublin (IE); Adi Botea, Dublin (IE); Elizabeth Daly, Dublin (IE); Pablo Pedemonte, Buenos Aires (AR); Abel Nicolas Valente, Capital Federal (AR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 269 days.

This patent is subject to a terminal disclaimer.

(21) Appl. No.: 16/551,446

(22) Filed: Aug. 26, 2019

(65) Prior Publication Data

US 2021/0065325 A1 Mar. 4, 2021

(51) Int. Cl.
*G06Q 50/20* (2012.01)
*G06F 16/9536* (2019.01)
*G06F 16/9535* (2019.01)

(52) U.S. Cl.
CPC ..... *G06Q 50/2057* (2013.01); *G06F 16/9535* (2019.01); *G06F 16/9536* (2019.01)

(58) Field of Classification Search
None
See application file for complete search history.

(56) References Cited

U.S. PATENT DOCUMENTS

| 8,398,490 | B1 | 3/2013 | Phelon et al. | |
| 2005/0096973 | A1* | 5/2005 | Heyse | G06Q 50/10 705/7.39 |
| 2010/0057659 | A1 | 3/2010 | Plelon et al. | |
| 2012/0173295 | A1* | 7/2012 | Phelon | G06Q 10/00 705/7.13 |
| 2013/0212031 | A1* | 8/2013 | Barnfield | G06Q 10/06 705/320 |
| 2014/0272911 | A1 | 9/2014 | York et al. | |
| 2015/0088774 | A1 | 3/2015 | Ortiz | |

(Continued)

OTHER PUBLICATIONS

X. J. S. Ashok, E. Lim and P. K. Prasetyo, "JobSense: A Data-Driven Career Knowledge Exploration Framework and System," 2018 IEEE International Conference on Data Mining Workshops (ICDMW), Singapore, Singapore, 2018, pp. 1411-1416, doi: 10.1109/ICDMW. 2018.00200. (Year: 2018).*

(Continued)

*Primary Examiner* — Lynda Jasmin
*Assistant Examiner* — Laura Yesildag
(74) *Attorney, Agent, or Firm* — Griffiths & Seaton PLLC (57) ABSTRACT

Embodiments for intelligent career planning assessment in a computing environment by a processor. A career planning pathway of a career planning model for a user may be monitored for achieving a career goal. One or more deviations from the career planning pathway may be identified according a user profile, one or more behaviors of the user, one or more environmental factors, or a combination thereof.

12 Claims, 7 Drawing Sheets

(56) References Cited

U.S. PATENT DOCUMENTS

| | | | |
|---|---|---|---|
| 2016/0104259 A1* | 4/2016 | Menrad | G06Q 10/105 |
| | | | 705/328 |
| 2016/0232462 A1 | 8/2016 | Woodward et al. | |
| 2016/0320946 A1* | 11/2016 | Zhao | G06F 16/9535 |
| 2017/0109850 A1 | 4/2017 | Chetlur et al. | |
| 2018/0039946 A1* | 2/2018 | Bolte | G06Q 50/2057 |
| 2018/0218330 A1* | 8/2018 | Kadambala | G06Q 10/06398 |
| 2018/0232751 A1* | 8/2018 | Terhark | G06Q 10/063118 |
| 2018/0253811 A1* | 9/2018 | Chan | G06Q 50/2057 |
| 2019/0303798 A1* | 10/2019 | Xie | G06Q 50/01 |
| 2019/0340945 A1* | 11/2019 | Malhotra | G06N 5/022 |

OTHER PUBLICATIONS

Richard J. Oentaryo, Xavier Jayaraj Siddarth Ashok, Ee-Peng Lim, and Philips Kokoh Prasetyo, "JobComposer: Career Path Optimization via Multicriteria Utility Learning" 2018, arxiv.org | Sep. 4, 2018 | ECML-PKDD Data Science for Human Capital Management 2018. (Year: 2018).*

K. D. Amitha Peiris and I. Gan, "A recommender systems approach to optimising career pathways development planning for youth in emerging knowledge economies," 2013 International Conference on Advances in ICT for Emerging Regions (ICTer), 2013, pp. 98-103, doi: 10.1109/ICTer.2013.6761162 (Year: 2013).*

"Goal-oriented visualizations of activity tracking: a case study with engineering students" Santos et al. LAK'12 Apr. 29-May 2, 2012, Vancouver, BC, Canada. (10 Pages).

* cited by examiner

FIG. 7

INTELLIGENT CAREER MONITORING AND CORRECTION IN A COMPUTING ENVIRONMENT

BACKGROUND OF THE INVENTION

Field of the Invention

The present invention relates in general to computing systems, and more particularly, to various embodiments for intelligent career planning monitoring and correction in a computing environment using a computing processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. For example, processing devices, with the advent and further miniaturization of integrated circuits, have made it possible to be integrated into a wide variety of devices. As great strides and advances in technologies come to fruition, these technological advances can be then brought to bear in everyday life. For example, the vast amount of available data made possible by computing and networking technologies may then assist in improvements to improve the quality of life and future life choices and planning.

SUMMARY OF THE INVENTION

Various embodiments for intelligent career planning monitoring and correction in a computing environment by a processor, are provided. In one embodiment, by way of example only, a method for implementing intelligent career planning assessment (e.g., monitoring and correcting a career goal) in a computing environment, again by a processor, is provided. A career planning pathway of a career planning model for a user may be monitored for achieving a career goal. One or more deviations from the career planning pathway may be identified according a user profile, one or more behaviors of the user, one or more environmental factors, or a combination thereof.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As the amount of electronic information continues to increase, the demand for sophisticated information access systems also grows. Digital or "online" data has become increasingly accessible through real-time, global computer networks. The data may reflect many aspects of various organizations and groups or individuals, including scientific, political, governmental, educational, businesses, and so forth.

Moreover, people-driven organizations tend to rely on an employee-centric organizational structure. Employee skills and performances are directly or indirectly encoded in many different information sources ranging from their curriculum vitae ("CVs") to skill-sets, performance evaluations, and/or projects associated with them within the organization. As a result of this, a full understanding of an employee's skill-set and performance evaluation is critical for many companies. That said, with the vast amount of educational and occupational opportunities, making and selecting correct educational and career choices for an individual plays a significant impact on an individual becoming a qualified candidate/employee for a particular organization.

However, selecting the correct career trajectory that maximizes the greatest likelihood to accomplish a career goal is particularly difficult due to a lack of collective information and limited access to many resources. Moreover, in today's employment environment, careers or job selections by dynamically change. For example, a user may no longer enjoy a current career and/or career plan and takes/performs actions that are inconsistent with a desired career goal or plan. Also, a user may agree with a recommended career plan, but fail to keep up to date with each of the necessary steps required to achieve the goal. Additionally, due to environmental reasons (e.g., company acquisition and/or restructuring) a suggested career plan may even become obsolete. As such, a need exists to enhance a career recommendation system with a sub-system designed to monitor user progress, detect deviations/lack of progress, and/or being aware of changes that may render a career plan obsolete Accordingly, the present invention provides for an intelligent computing system that provides for implementing intelligent career planning assessment (e.g., monitoring and correcting a career goal) in a computing environment. A career planning pathway of a career planning model for a user may be monitored for achieving a career goal. One or more deviations from the career planning pathway may be identified according a user profile, one or more behaviors of the user, one or more environmental factors, or a combination thereof. In one aspect, career plan deviation data gathered from monitoring may be retrofitted to the intelligent career planning recommendation system, progressively improving recommendations.

In one aspect, the monitored career planning pathway of a career planning model may be used to improve/change current plans and give better recommendations to similar users in a subsequent period of time (e.g., future).

In an additional aspect, the present invention may monitor, track, and/or learn one or more environmental changes (e.g., becoming obsolete due to organizational changes). The present invention provides detection of deviation from a career goal and checks one a variety of sources (e.g., social network, internet, databases, etc.). One or more mitigation career plans may be suggested and may provide one or more incentives to continue with the career plan and/or change/alter the career path.

In an additional aspect, the present invention provide a career recommendation system by taking as input a user and the recommended plan as a series of steps. User activity inside an organization may be monitored in an organizational-dependent way. In one embodiment, the intelligent career recommendation system may monitor user's activity on intranet sites such as, for example, social networks, forums, source code repositories, learning sites, awards, achievements, etc. The user activity may also be monitored outside an organization by keeping track of taken courses one or more entity websites/databases (e.g., an academic, employment, and/or organizational entity), publications, patents, awards, organization affiliations, public social networks, etc. An organizational environment may be monitored by keeping track of organizational announces made by email or intranet sites, changes on organizational databases such as, for example, an organizational server that changes position of people with profiles similar to the user, etc.

In an additional aspect, the present invention may monitor and trace each step and/or action sub-steps for a career path for a selected user using a career recommendation model. In one aspect, the career recommendation model may be an abstraction for each of the action steps and/or action sub-steps in a career path for each user for achieving a career goal for that particular user. The career recommendation model may include those action steps and/or action sub-steps that should be performed by the selected user to achieve a career goal, all of which may be monitored by the career recommendation system. The career recommendation model may be generalized as previous "plans" using a logical regression operation which indicates precisely what conditions, requirements, operations, or parameters must be met, satisfied, and/or performed for a plan fragment to achieve the career objectives of the selected user. That is, actions (e.g., "steps") are the building blocks of a plan and a plan fragment may contain one or more actions/steps. The career pathway policy of multiple plans can be combined (e.g., synthesized) into a single "executable" plan capable of making case-specific recommendations.

Each career plan trajectory of the career recommendation model for the career goal may be analyzed and monitored for determining the validity and/or invalidity of the career plan trajectory by comparing the career plan trajectory to an updated/modernized career plan trajectory model of a domain, which may be performed by ascertaining plan validity of the trajectory. For example, the ascertaining plan validity of the trajectory involves monitoring the progress of user along the career and decide whether the progress is consistent with the plan. For example, if the plan indicates to stay in a role "A" for 2 years, but the user has been in the role for 2.5 years, then an alarm may be raised. Another example is when a role included in a future part of a plan but no longer exists in the job market (and/or company) (e.g., a company sells away its hardware division) the roles specific to that division would no longer exist in the company). Even upon determining a career plan trajectory is valid, the career plan trajectory may not be optimal. Thus, one or more career plan trajectories may be identified for improvement or modernization according via a comparison operation with the updated/modernized career plan trajectory model of career planning using techniques for plan refinement.

In an additional aspect, the career recommendation system may include monitoring a career planning trajectories for a career path. For example, one or more action steps and/or action sub-steps that lead to a negative result/failure such as, for example, being fired/terminated from employment may also be monitored. Action steps and/or action sub-steps with negative outcomes (e.g., negative having a negative, failing, or hindering effect upon achieving the career goal) such as, for example, expensive training that may never be used may monitored. Thus, in one aspect, one or more alternative user career paths (e.g., user career paths of persons having achieved a career goal) may be matched and recommend to a user.

A knowledge domain/library of positive and/or negative career trajectories/paths may be used to provide targeted feedback to address and provide assistance to the user for improving, correcting, changing one or more action steps and/or action sub-steps. For example, in a business setting, one or more action/behavior patterns of failure may be identified and addressed with the selected user.

It should be noted as used herein, "intelligent" (or "intelligence") may refer to a mental action or process of acquiring knowledge and understanding through thought, experience, and one or more senses using machine learning (which may include using sensor based devices or other computing systems that include audio or video devices). "Intelligence" may also refer to identifying patterns of behavior, leading to a "learning" of one or more events, operations, or processes. The term "intelligent" or "intelligence" may refer to an artificial intelligent/machine learning system. The intelligent system may be a specialized computer system, or set of computer systems, configured with hardware and/or software logic (in combination with hardware logic upon which the software executes) to emulate human cognitive functions. These intelligent systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. An intelligent system may perform one or more computer-implemented cognitive operations that approximate a human thought process while enabling a user or a computing system to interact in a more natural manner. An intelligent system may comprise artificial intelligence logic, such as natural language processing (NLP) based logic, for example, and machine learning logic, which may be provided as specialized hardware, software executed on hardware, or any combination of specialized hardware and software executed on hardware. The logic of the intelligent system may implement the cognitive operation(s), examples of which include, but are not limited to, question answering, identification of related concepts within different portions of content in a corpus, and intelligent search algorithms, such as Internet web page searches.

In general, such intelligent systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
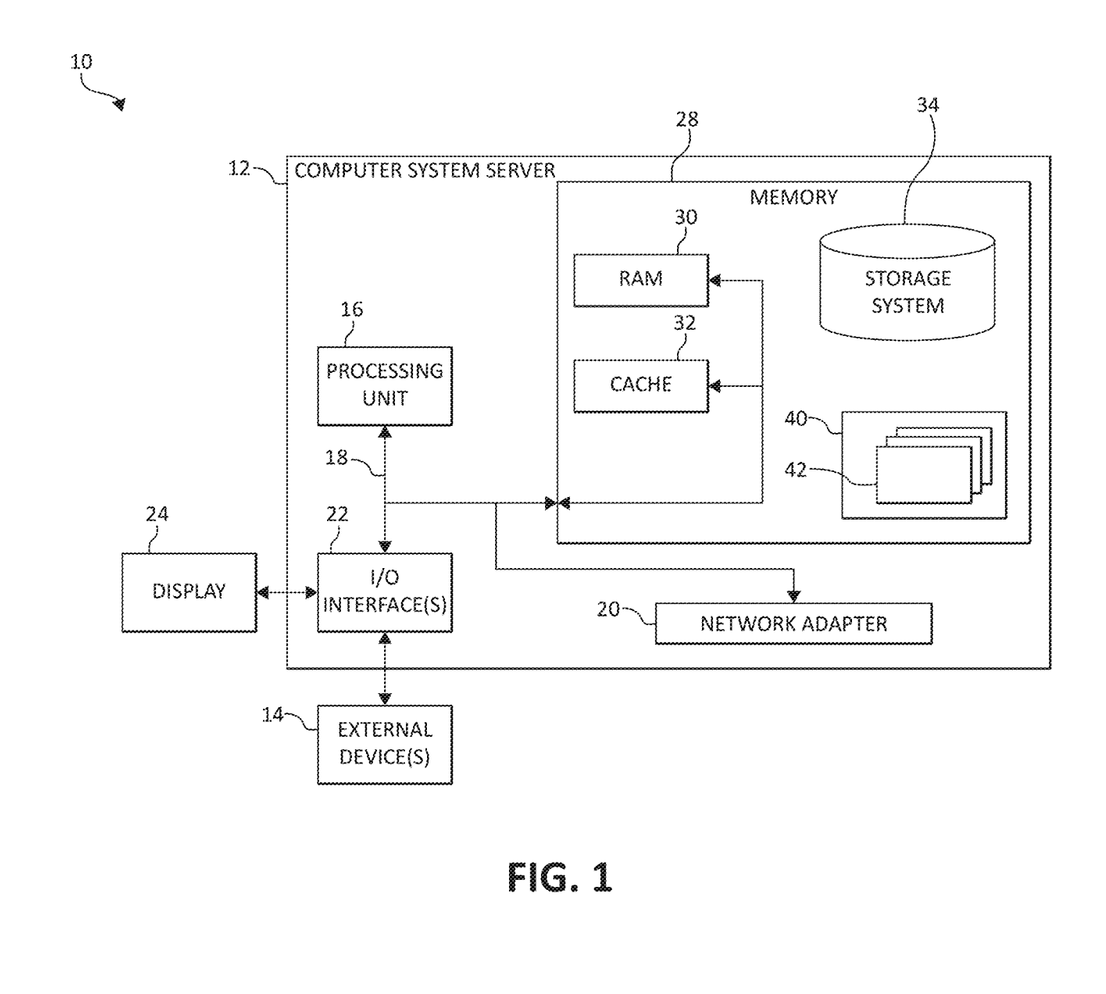
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16 (which may be referred to herein individually and/or collectively as "processor"), a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
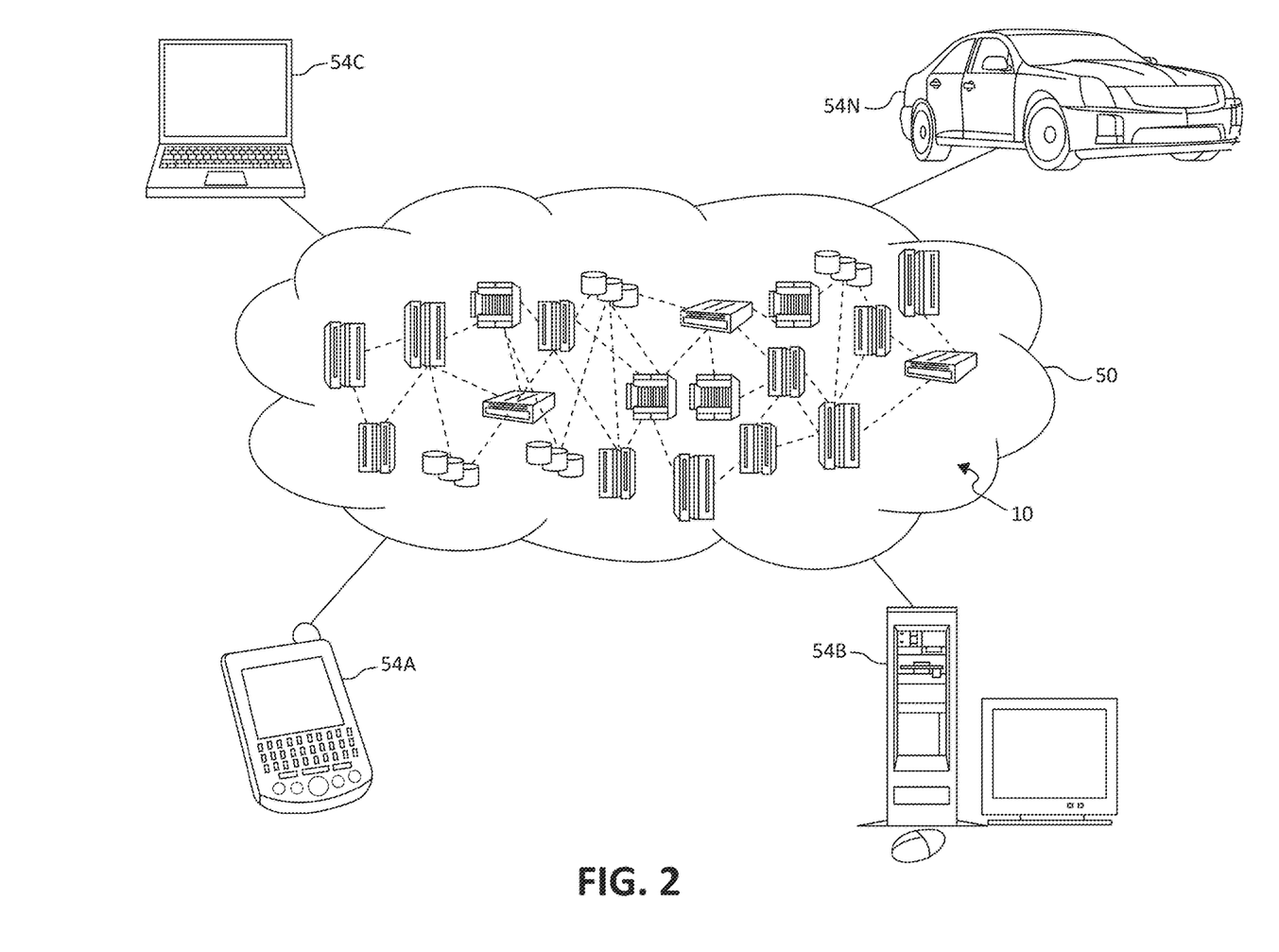
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
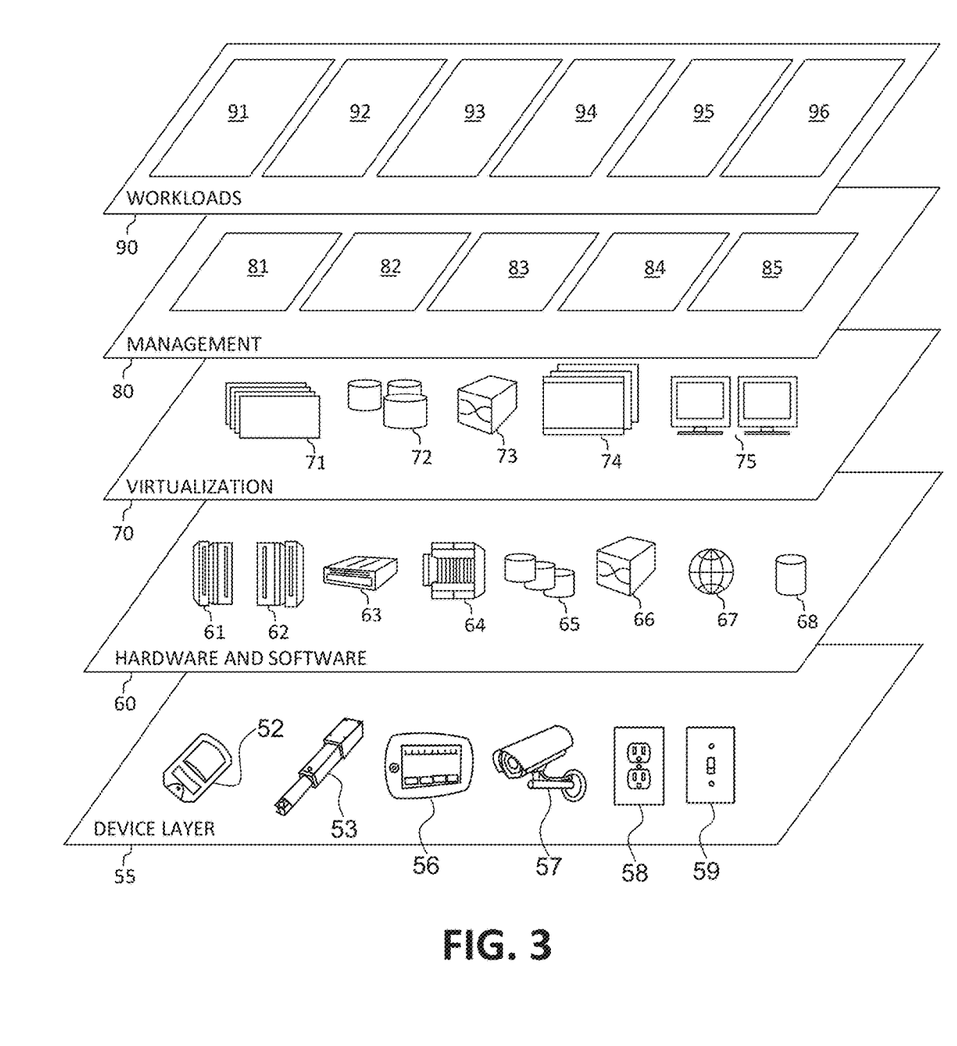
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent career planning monitoring and correction in a computing environment. In addition, workloads and functions 96 for intelligent career planning monitoring and correction in a computing environment may include such operations as data analysis, machine learning (e.g., artificial intelligence, natural language processing, etc.), user analysis, IoT sensor device detections, operation and/or analysis, as will be further described. One of ordinary skill in the art will appreciate that the workloads and functions 96 for intelligent career planning monitoring and correction in a computing environment may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

As previously stated, the mechanisms of the illustrated embodiments provide a novel solution for monitor a user's progress along a career pathway. A career pathway annotated with relevant information, user actions monitored in time, and changes in the external/working environment may be monitored in time. Those actions that signal deviations from the career pathway plan may include notifying the user to the recommender system that produced the career pathway plan. Deviation signals may include, for example, 1) failure to complete stages of the suggested career pathway plan, 2) an accumulation of actions that are unrelated to the current plan, 3) failure to follow the plan on time, with respect of average times measured for users with the same or similar plan, and/or 4) external/environmental changes that may render the plan outdated or invalid.

In an additional aspect, the intelligent career planning monitoring and correction (e.g., a career recommender system) may notify each user about career pathway deviations reported by a progress monitoring operation in the intelligent career planning monitoring and correction system, which may take as input a report from progress monitoring operation 1) one or more deviation reasons, 2) any identified and uncovered action steps in the career plan, and/or 3) any statistics about average completion times for stages in a given career pathway.

The intelligent career planning monitoring and correction (e.g., a career recommender system) may notify the user about the deviation and queries the user as to whether to continue with the career pathway plan, to modify the career plan while keeping the original and final career goal, and/or to determine an entirely new plan. The intelligent career planning monitoring and correction may learn one or more user preferences that reflect new information in its user model to produce more accurate career recommendations.

Figure 4:
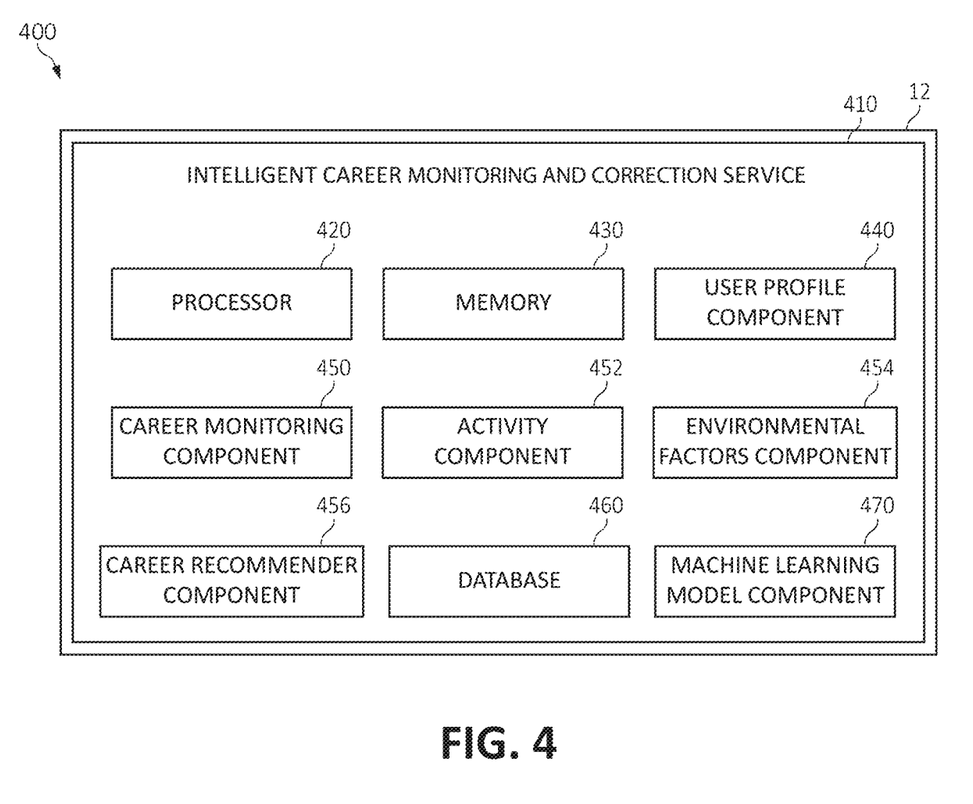
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. An intelligent career planning monitoring and correction service 410 is shown, incorporating processing unit ("processor") 420 to perform various computational, data processing and other functionality in accordance with various aspects of the present invention. The intelligent career planning monitoring and correction service 410 may be provided by the computer system/server 12 of FIG. 1. The processing unit 420 may be in communication with memory 430. The intelligent career planning monitoring and correction service 410 may also include a user profile component 440, a career monitoring component 450, an activity component 452, an environmental factors component 454, a career recommender component 456, a database 460 (e.g., knowledge domain), and a machine learning component 470.

As one of ordinary skill in the art will appreciate, the depiction of the various functional units in the intelligent career planning monitoring and correction service 410 is for purposes of illustration, as the functional units may be located within the intelligent career planning monitoring and correction service 410 or elsewhere within and/or between distributed computing components.

In one aspect, the computer system/server 12 and/or the intelligent career planning monitoring and correction service 410 may provide virtualized computing services (i.e., virtualized computing, virtualized storage, virtualized networking, etc.). More specifically, the intelligent career planning monitoring and correction service 410 may provide, and/or be included in, a virtualized computing, virtualized storage, virtualized networking and other virtualized services that are executing on a hardware substrate.

The user profile component 440 may collect, store, maintain, and/or update one or more user profiles. For example, an organization may store and maintain a user profile for each particular entity/person (e.g., employee, student, group member, etc.). In an additional aspect, the user profile component 440 may store a user profile for a selected user according to a specified career goal. Historical data of alternative users having achieved the specified career goal may also be stored and maintained via database 460 by the user profile component.

In one aspect, the career monitoring component 450 may receive, create, and/or learn a career planning model for a user according to a career goal, a user profile, and historical data. For example, the career monitoring component 450 may generate, receive, and/or learn a career planning pathway of the career planning model for a user for achieving a career goal.

As preliminary matter, the career monitoring component 450 may identify a series of actions steps for achieving the career goal, identify a subset of actions for having a positive or negative impact on achieving the career goal, and/or infer one or more actions steps for completing the series of actions steps for achieving the career goal. The career monitoring component 450 may monitor a career planning pathway of the career planning model for achieving a career goal by a user.

The career monitoring component 450, in association with the user profile component 440, activity component 452, and/or the environmental factors component 454 may identify one or more deviations from the career planning pathway according a user profile, one or more behaviors of the user, one or more environmental factors, or a combination thereof.

In one aspect, the career monitoring component 450 may identify a series of actions steps for achieving one or more achievement stages required by the career planning pathway. In an additional aspect, the career monitoring component 450 may identify one or more deviations from the career planning pathway as a failure to complete one or more actions steps of the career planning pathway, and/or identify the one or more deviations as accumulation of one or more non-related action steps that are irrelevant to the career planning pathway.

Additionally, the career monitoring component 450 may identify the one or more deviations as a failure to complete one or more actions steps of the career planning pathway over a defined period of time where the defined period of time may be an average time period necessary to complete the action steps performed by one or more alternative users having previously achieved the career goal.

The environmental factors component 454 may also identify one or more changes to the one or more environmental factors having positive impacts for achieving the career goal or negative impacts that invalidate the career goal.

The career recommender component 456 may recommend an alternative career path according to the monitoring of the career monitoring component 450. More specifically, using the machine learning component 470, the career recommender component 456 may 1) suggest one or more alternative career goals and/or pathways (including modifications and/or adjustments), 2) suggest one or more action steps to increase an amount of time required to complete the career goal, and/or 3) select one or more valid career path trajectories having a greater positive impact upon the user for achieving the career goal (or alternative career paths to an alternative career goal) as compared to alternative career path trajectories.

Thus, information gathered by the career monitoring component 450 may be used to measure progress on the recommended plan, resulting in one or more of the following notifications steps. Step 1), progress made and encouragement to keep up to the plan. Step 2), lack of progress, advice on how to tackle next task in the plan, and suggestion to create a new plan. Step 3), significant deviations from the plan, and invitation to go through the career recommendation system again to devise an improved or different plan. Step 4), external changes possibly rendering the plan obsolete, and suggestion to visit the career recommendation system again to confirm or create an alternative plan. Step 5), knowledge about deviation data and users preferences obtained from steps (3) and (4) will be retrofitted to recommendation system, thus improving future recommendations.

In one embodiment, by way of example only, the machine learning component 470 as used herein may include, for example, an instance of IBM® Watson® such as Watson® Analytics (IBM® and Watson® are trademarks of International Business Machines Corporation). By way of example only, the machine learning component 470 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

In one aspect, the database 460 may be a knowledge domain and/or an ontology of concepts representing a domain of knowledge (e.g., skills, tasks, academic/educational requirements, action steps, pathways, data relating to different careers or career types, data relating to external data/environmental conditions having a direct and/or indirect impact upon a career goal, etc.) for monitoring a career pathway and providing one or more steps and/or sub steps for recommending one or more actions to achieve the career goal or recommend and alternative career goal.

A thesaurus or ontology may be used as the domain knowledge of the database 460 and may also be used to identify relationships between observed and/or unobserved variables parameters. In one aspect, the term "domain" is a term intended to have its ordinary meaning. In addition, the term "domain" may include an area of expertise for a system or a collection of material, information, content and/or other resources related to a particular subject or subjects. For example, a domain can refer to environmental, scientific, industrial, educational, statistical data, commercial, health, manufacturer information, technological information, one or more decisions and response types in a variety of applications. A domain can refer to information related to any particular subject matter or a combination of selected subjects.

Figure 5:
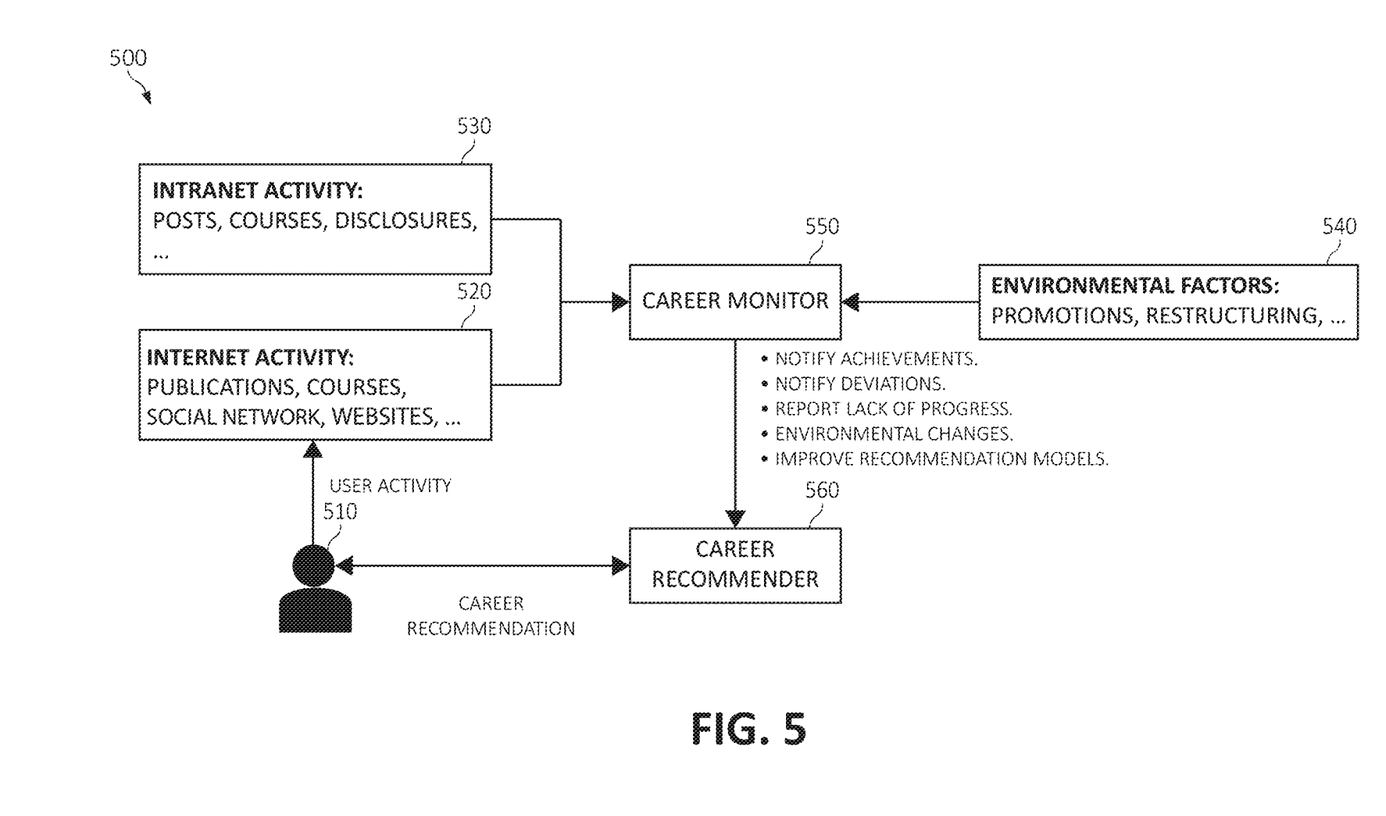
FIG. 5 is a block-flow diagram depicting an exemplary operation for intelligent career planning assessment in a computing environment by a processor in which aspects of the present invention may be realized.

Turning now to FIG. 5, a block diagram of exemplary functionality 500 relating to intelligent career planning actions in a computing environment. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 1-4. With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere.

Activity of a user 510 may be received as input data. More specifically, in blocks 520 and 530, the input data (e.g., information and data) relating to activities of the user 510 may be collected and gathered such as, for example, "intranet activity" from block 530 that may include various online posts, courses (e.g., educational or skills-based courses), disclosures, etc. and/or "internet activity" that may include publications, courses (e.g., educational or skills-based courses), social networks and associated activities, etc.

Using the data from blocks 520 and 530, a career monitoring component (see also FIG. 4) may monitor the career goals for the user 510 based on monitoring the user's activities. The career monitoring operation, in block 550, may be used to measure progress on the recommended plan. In block 560, a career recommender may recommend pursuing a current career goal and/or an alternative career goal. Also, the career recommender in block 560, may provide back to user 510 one or more various types of notifications such as, for example, providing notification of achievements, deviations from the career plan, a report indicating lack of progress, environmental changes, and/or improve recommendation models.

More specifically, the resulting notifications (which may be measured from the progress on the recommended plan based on the career monitoring in block 550) may include the following steps.

Step 1), the notifications may include providing progress made on the career path/plan towards the career goal and providing encouragement to keep up/maintain the current course of action to complete each step of the career path/plan towards the career goal.

Step 2), the recommendations/notifications may include indication of a lack of progress, advice on specific actions steps to achieve the career goal (e.g., actions steps on how to accomplish/complete a next task in the career plan), and/or suggestions to create a new career plan.

Step 3), the recommendations/notifications may include providing one or more deviations from the career plan, and/or an invitation to engage in accessing and repeating the use of career recommendation system (see FIG. 4) to devise an improved or different plan.

Step 4), the recommendations/notifications may also include providing one or more external changes (e.g., environmental factors) that may render the career plan obsolete (e.g., promotions, restructuring of an organizations, position in the career is no longer available, educational courses no longer required, a certain educational level is required, etc.) and providing a suggestion to visit the career recommendation system to confirm or create an alternative plan.

Step 5), the recommendations/notifications may include providing knowledge and deviation data and users preferences obtained from steps 3 and 4 will be retrofitted to recommendation system, thus improving future recommendations. In one aspect, the recommended actions may be provided to one or more internet of things ("IoT") computing devices (e.g., a graphical user interface of a computer or smart phone).

In view of the foregoing features and functionalities FIGS. 1-5, the following embodiments may be provided for intelligent career planning monitoring and correction. In one aspect, a career plan may be produced/generated for user by a career recommendation system. A monitoring system (e.g., the career monitoring component 450 of FIG. 4) in the career recommendation system may track user activity. The user activity may include intranet sites inside the organization's intranet such as, for example, organizational social networks and forums, source code repositories, learning sites, etc. The user activity may include activity outside an organization boundaries such as, for example, patents, publications, activity on social networks, educational courses, affiliations, etc. The monitoring system in the career recommendation system may also track changes in organizational structure such as, for example, by monitoring public announcements using natural language understanding ("NLU") operations and subscribing to news publications relating to promotions related to the career plan's goal, or information about user's coworkers.

In an additional embodiment, the monitoring system may employ topic modeling (and/or natural language classification operations) to classify data/content obtained from monitoring and tracking (as illustrated herein) as relevant, neutral, or non-relevant for the current step in the proposed career plan along with a confidence score. A weighted sum of relevance of the content may be obtained and an overlapping coefficient with respect to the career plan may also be obtained. If overlapping coefficient is above a selected threshold, no deviation is detected. A current step of the career plan is then moved one step forward/towards the career goal and a congratulatory notification is sent to the user. If the overlapping coefficient is below a given threshold, the monitoring system may determine overlapping of the current career plans/goals with respect to other active career plans. If there exist an alternative career plan having a degree of similarity above the given threshold, the monitoring system may send to the user an invitation to go through the career recommendation system again. The career recommendation system may receive as input data information about the alternative career plan so it can make career suggestions related to alternate goals in such new plan (e.g., assuming the user wants to change the initial goal, which would be checked first by the career recommendation system).

However, if there are no alternative career plans matching the user's current activity, a notification may be sent to the user providing details about the lack of progress towards the current career plan and goal and provide advice on how to complete current step in a current career plan. Such advise may be based on what other users have done/performed to complete such step. Additionally, a notification may be provided that includes a suggestion to create a plan. Otherwise, the career recommendation system (see FIGS. 4 and 5) may check if any external changes (e.g., environmental changes) that may render the current career plan obsolete. Any data (e.g., announcements, changes, or information) about career promotions related to a final goal in the current career plan or activities of other users other that relate to the current career goal may trigger a notification to the user warning the user that the career plan may need to be adjusted, altered, modified, or changed.

In the event the original/current career plan is changed or adjusted, the relevant information about the user and the reason for the adjustment, alteration, modification, or change (e.g., lack of overlapping with the user's action or lack of progress) would be used to enrich the models used by the career recommendation system. For example, the career recommendation system, which may include machine learning operations, may learn/know that a certain percentage of users similar to the user would end-up switching to an alternative plane when the initial recommendation is the current (and the reason for such change). This retrofitted a-posteriori knowledge may be leveraged by the career recommendation system to produce/generate career plans having an increased propensity/percentage to be successfully completed.

Additionally, assuming the current career plan is changed, information about progress times may be sent to the career recommendation system so future plans may include statistical information about expected times to cover each of the steps comprising such plans.

Figure 6:
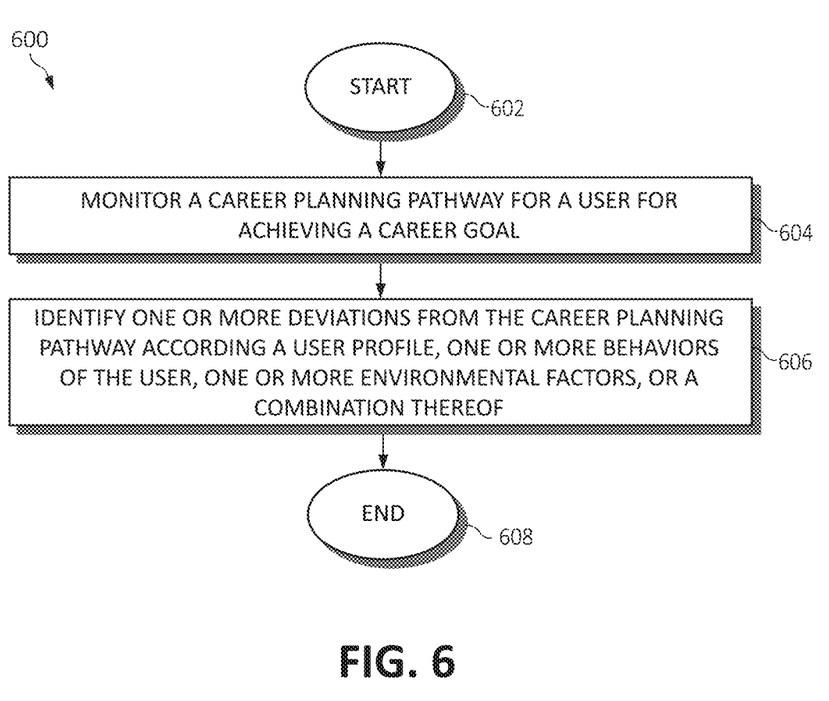
FIG. 6 is a flowchart diagram depicting an exemplary method for intelligent career planning assessment by a processor, again in which aspects of the present invention may be realized.

Turning now to FIG. 6, a method 600 for implementing intelligent career planning assessment in a computing environment is depicted, in which various aspects of the illustrated embodiments may be implemented. The functionality 600 may be implemented as a method executed as instructions on a machine, where the instructions are included on at least one computer readable medium or on a non-transitory machine-readable storage medium. The functionality 600 may start in block 602.

A career planning pathway of a career planning model for a user may be monitored for achieving a career goal, as in block 604. One or more deviations from the career planning pathway may be identified according a user profile, one or more behaviors of the user, one or more environmental factors, or a combination thereof, as in block 606. The functionality 600 may end in block 608.

Figure 7:
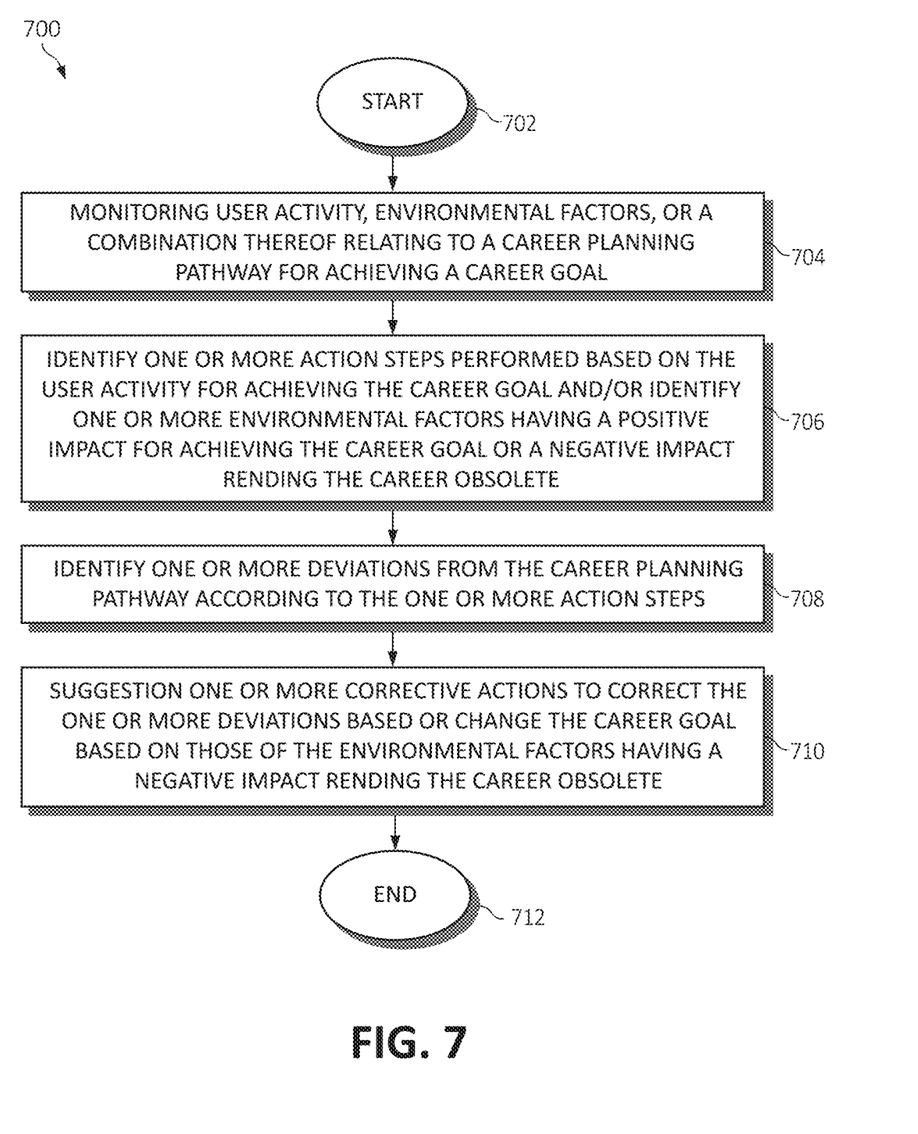
FIG. 7 is a flowchart diagram depicting an exemplary method for intelligent career planning assessment in computing environment in which aspects of the present invention may be realized.

Turning now to FIG. 7, a method 700 for implementing intelligent career planning actions in a computing environment is depicted, in which various aspects of the illustrated embodiments may be implemented. The functionality 700 may be implemented as a method executed as instructions on a machine, where the instructions are included on at least one computer readable medium or on a non-transitory machine-readable storage medium. The functionality 700 may start in block 702.

User activity, one or more environmental factors (e.g., external factors), or a combination thereof relating to a career planning pathway for achieving a career goal may be monitored, as in block 704. One or more action steps performed based on the user activity for achieving the career goal may be monitored and/or one or more environmental factors having a positive impact for achieving the career goal or a negative impact rending the career obsolete may be identified, as in block 706. One or more deviations from the career planning pathway may be identified according to the one or more action steps, as in block 708. One or more corrective actions may be suggested to correct the one or more deviations or change the career goal based on those of the environmental factors having a negative impact rending the career obsolete, as in block 710. The functionality 700 may end in block 712.

In one aspect, in conjunction with and/or as part of at least one block of FIGS. 6-7, the operations of methods 600 and/or 700 may include each of the following. The operations of methods 600 and/or 700 may identify a series of actions steps for achieving one or more achievement stages required by the career planning pathway, identify the one or more deviations as a failure to complete one or more actions steps of the career planning pathway, identify the one or more deviations as accumulation of one or more non-related action steps that are irrelevant to the career planning pathway, and/or identify the one or more deviations as a failure to complete one or more actions steps of the career planning pathway over a defined period of time. The defined period of time may be an average time period necessary to complete the action steps performed by one or more alternative users having previously achieved the career goal.

The operations of methods 600 and/or 700 may identify one or more changes to the one or more environmental factors having positive impacts for achieving the career goal or negative impacts that invalidate the career goal. The operations of methods 600 and/or 700 may initiate a machine learning operation to 1) suggest one or more alternative career goals, 2) suggest one or more action steps to increase an amount of time required to complete the career goal, and/or 3) select one or more of the plurality of valid career path trajectories having greater positive impact upon the user for achieving the career goal as compared to alternative ones of the plurality of valid career path trajectories.

The operations of methods 600 and/or 700 may also identify a series of actions steps for achieving the career goal, and identify a subset of actions for having a negative impact on achieving the career goal. The operations of method 700 may infer one or more actions steps for completing a series of actions for achieving the career goal. The career planning model may be synthesized from a series of actions steps for achieving the career goal.

The operations of method 700 may identify positive or negative impacts for achieving the career goal according to alternative results generated from selecting alternative choices at each actions step performed by the alternative users to achieve the career goal. Additionally, the operations of method 700 may identify a plurality of valid career path trajectories having a series of actions steps for achieving the career goal, and select one or more of the plurality of valid career path trajectories having greater positive impact upon the user for achieving the career goal as compared to alternative ones of the plurality of valid career path trajectories.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for intelligent career planning assessment in a computing environment, comprising:
   monitoring a career planning pathway of a career planning model for a user for achieving a career goal, wherein the monitoring is inclusive of implementing a topic modeling operation to classify content produced by the user as relevant and non-relevant to a current portion of the career planning pathway;
   identifying one or more changes to one or more environmental factors having positive impacts for achieving the career goal or negative impacts that invalidate the career goal;
   identifying one or more deviations from the career planning pathway according to a user profile of the user, one or more behaviors of the user, and the one or more environmental factors, wherein at least one of the one or more deviations is identified by determining a weighted sum of a relevance of the content produced by the user and an overlapping coefficient of the sum to the career planning model is above a predefined threshold;
   in conjunction with identifying the one or more deviations, determining the one or more deviations as a failure to complete one or more action steps of the career planning pathway over a defined period of time, wherein the defined period of time is an average time period necessary to complete the one or more action steps performed by one or more alternative users having previously achieved the career goal;
   executing machine learning logic to generate, according to the identified one or more deviations, one or more recommendations for the user to continue on the career planning pathway or an alternate career planning pathway;
   determining those of the one or more recommendations the user accepted and performed, and correlating those of the accepted one or mo re recommendations to a progression of one or more alternative users having similar deviations to the identified one or more deviations from a similar career planning model to the career planning model of the user; and
   executing the machine learning logic to iteratively update the career planning model using feedback identified from the correlation, wherein iteratively updating the career planning model using the feedback includes performing the monitoring of the career planning pathway to ascertain a current validity of the career planning pathway, and updating the machine learning logic to refine the career planning model according to the current validity.

2. The method of claim 1, further including identifying a series of the one or more action steps for achieving one or more achievement stages required by the career planning pathway.

3. The method of claim 1, further including identifying the one or more deviations as accumulation of one or more non-related action steps that are irrelevant to the career planning pathway.

4. The method of claim 1, further including executing the machine learning logic to:
   suggest one or more alternative career goals;
   suggest one or more additional action steps to increase an amount of time required to complete the career goal;
   select one or more of a plurality of valid career path trajectories having greater positive impact upon the user for achieving the career goal as compared to alternative ones of the plurality of valid career path trajectories.

5. A system for intelligent career planning assessment in a computing environment, comprising:
   one or more computers with executable instructions that when executed cause the system to:
      monitor a career planning pathway of a career planning model for a user for achieving a career goal;
      identify one or more changes to one or more environmental factors having positive impacts for achieving the career goal or negative impacts that invalidate the career goal;
      identify one or more deviations from the career planning pathway according to a user profile of the user, one or more behaviors of the user, and the one or more environmental factors, wherein at least one of the one or more deviations is identified by determining a weighted sum of a relevance of the content produced by the user and an overlapping coefficient of the sum to the career planning model is above a predefined threshold;
      in conjunction with identifying the one or more deviations, determine the one or more deviations as a failure to complete one or more action steps of the career planning pathway over a defined period of time, wherein the defined period of time is an average time period necessary to complete the one or more action steps performed by one or more alternative users having previously achieved the career goal;
      execute machine learning logic to generate, according to the identified one or more deviations, one or more recommendations for the user to continue on the career planning pathway or an alternate career planning pathway;
      determine those of the one or more recommendations the user accepted and performed, and correlating those of the accepted one or more recommendations to a progression of one or more alternative users having similar deviations to the identified one or more deviations from a similar career planning model to the career planning model of the user; and
      execute the machine learning logic to iteratively update the career planning model using feedback identified from the correlation, wherein iteratively updating the career planning model using the feedback includes performing the monitoring of the career Planning pathway to ascertain a current validity of the career planning pathway, and updating the machine learning logic to refine the career planning model according to the current validity.

6. The system of claim 5, wherein the executable instructions further identify a series of the one or more action steps for achieving one or more achievement stages required by the career planning pathway.

7. The system of claim 5, wherein the executable instructions further identify the one or more deviations as accumulation of one or more non-related action steps that are irrelevant to the career planning pathway.

8. The system of claim 5, wherein the executable instructions further execute the machine learning logic to:
   suggest one or more alternative career goals;
   suggest one or more additional action steps to increase an amount of time required to complete the career goal; and
   select one or more of a plurality of valid career path trajectories having greater positive impact upon the user for achieving the career goal as compared to alternative ones of the plurality of valid career path trajectories.

9. A computer program product for intelligent career planning assessment by a processor, the computer program product comprising a non-transitory computer-readable storage medium having computer-readable program code portions stored therein, the computer-readable program code portions comprising:
   an executable portion that monitors a career planning pathway of a career planning model for a user for achieving a career goal;
   an executable portion that identifies one or more changes to one or more environmental factors having positive impacts for achieving the career goal or negative impacts that invalidate the career goal;
   an executable portion that identifies one or more deviations from the career planning pathway according to a user profile of the user, one or more behaviors of the user, and the one or more environmental factors, wherein at least one of the one or more deviations is identified by determining a weighted sum of a relevance of the content produced by the user and an overlapping coefficient of the sum to the career planning model is above a predefined threshold;
   an executable portion that, in conjunction with identifying the one or more deviations, determines the one or more deviations as a failure to complete one or more action steps of the career planning Pathway over a defined period of time, wherein the defined period of time is an average time period necessary to complete the one or more action steps performed by one or more alternative users having previously achieved the career goal;
   an executable portion that executes machine learning logic to generate, according to the identified one or more deviations, one or more recommendations for the user to continue on the career planning pathway or an alternate career planning pathway;
   an executable portion that determines those of the one or more recommendations the user accepted and performed, and correlating those of the accepted one or more recommendations to a progression of one or more alternative users having similar deviations to the identified one or more deviations from a similar career planning model to the career planning model of the user; and
   an executable portion that executes the machine learning logic to iteratively update the career planning model using feedback identified from the correlation, wherein iteratively updating the career planning model using the feedback includes performing the monitoring of the career planning pathway to ascertain a current validity of the career planning Pathway, and updating the machine learning logic to refine the career Planning model according to the current validity.

10. The computer program product of claim 9, further including an executable portion that
   identifies a series of the one or more action steps for achieving one or more achievement stages required by the career planning pathway.

11. The computer program product of claim 9, further including an executable portion that identifies the one or more deviations as accumulation of one or more non-related action steps that are irrelevant to the career planning pathway.

12. The computer program product of claim 9, further including an executable portion that executes the machine learning logic to:
   suggest one or more alternative career goals;
   suggest one or more additional action steps to increase an amount of time required to complete the career goal; and
   select one or more of a plurality of valid career path trajectories having greater positive impact upon the user for achieving the career goal as compared to alternative ones of the plurality of valid career path trajectories.

* * * * *